United States Patent
Brouwer (10) Patent No.: US 7,398,099 B2
(45) Date of Patent: Jul. 8, 2008

(54) SYSTEM AND METHOD FOR SPEED INDICATION THROUGH TRANSMIT POWER CONTROL COMMANDS

(75) Inventor: Frank Bastiaan Brouwer, Enschede (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 322 days.

(21) Appl. No.: 10/506,389

(22) PCT Filed: Mar. 8, 2002

(86) PCT No.: PCT/NL02/00156

§ 371 (c)(1), (2), (4) Date: Sep. 2, 2004

(87) PCT Pub. No.: WO03/076964

PCT Pub. Date: Sep. 18, 2003

(65) Prior Publication Data

US 2005/0095989 A1 May 5, 2005

(51) Int. Cl.
*H04B 7/00* (2006.01)
(52) U.S. Cl. .................... 455/522; 455/69; 455/441
(58) Field of Classification Search ............. 455/441, 455/69, 522, 238.1; 342/461
See application file for complete search history.

(56) References Cited

U.S. PATENT DOCUMENTS 5,924,043 A * 7/1999 Takano ................. 455/522
6,249,682 B1 * 6/2001 Kubo et al. ............. 455/522

FOREIGN PATENT DOCUMENTS

| WO | WO 0131824 A | 5/2001 |
|----|---------------|--------|
| WO | WO 0141335 A | 6/2001 |
| WO | WO 0199303 A | 12/2001 |

OTHER PUBLICATIONS

Eropean Patent Office, International Search Report for PCT/NL02/00156, dated Nov. 7, 2002.

* cited by examiner

Primary Examiner—Matthew Anderson
Assistant Examiner—Angelica M. Perez
(74) Attorney, Agent, or Firm—Roger S. Burleigh (57) ABSTRACT

Speed indication device (100) for determining a speed indication signal (410) indicating a speed of a wireless mobile telecommunication device (14) relative to the speed indication device (100), wherein the speed indication device (100) determines the speed indication signal (410) from a sequence of transmit power control commands sent by the wireless mobile telecommunication device (14) to an access point (12) in a wireless telecommunication device (14) to an access point (12) in a wireless telecommunication network for controlling, in use, a transmit power of a radio signal transmitted by the access point (12) to the wireless mobile telecommunication device (14). If the relative speed is found to be above a threshold, the speed may be calculated using a measurement of the Doppler frequency.

2 Claims, 5 Drawing Sheets

SYSTEM AND METHOD FOR SPEED INDICATION THROUGH TRANSMIT POWER CONTROL COMMANDS

FIELD OF THE INVENTION

The present invention relates to a speed indication device as defined in the preamble of claim 1. Moreover, the present invention relates to a telecommunication access point encompassing such a speed indication device. Further, the present invention relates to a method for determining a speed indication by such a speed indication device.

PRIOR ART

In WO 01/41335 a relative velocity estimation using TPC commands is disclosed. In a system having an transmitter and a receiver that communicate over a radio channel and in which signal transmission power of the transmitter is adjusted to compensate for fading dips in the channel, the Rayleigh fading rate of the radio channel, and thus the relative velocity between transmitter and receiver are estimated by effectively observing the adjustments or fluctuations in signal transmission power or amplitude of the transmitter. This is done by observing TPC (Transmission Power Control) commands that cause the transmitter to adjust its signal transmission power to combat Rayleigh fading, i.e., fading dips.

Further, such a speed indication device is known from EP 0 913 953: "CDMA Reception apparatus which measures Doppler frequency of CDMA signals".

UMTS (Universal Mobile Telecommunication System) systems using W-CDMA (Wide-band Code Division Multiple Access) typically have multiple frequencies. These frequencies can be used in several ways, but one typical way is by building a so called hierarchical cell structure (HCS).

In HCS two or three layers of cells exist, each on its own frequency. The cells within the structure may be of different size. In one such layer, all cells have similar size. Typically, in a layer with small-sized cells, these cells are aimed at providing access to the system for mobile devices, such as mobile phones or other wireless electronic devices as personal computers and personal digital assistants (PCs, PDAs) etc. of low(er)-mobility users, while in another layer with large cells, these large cells provide access to mobile devices of high(er)-mobility users. For example, pedestrian speed users are on the small cells, and motorway speed users are on the large cells. With a three layer HCS a medium speed (with medium-sized cells) can also be identified.

Such a hierarchical cell structure has the advantage of a high capacity, through the small cells for low-mobility users, with limited number of hand-overs, through the large cells for the high-mobility users. In order to operate a cell structure using such a scheme, information on the speed of each mobile user within the HCS must be available.

In the speed indication device of the prior art, as disclosed in EP 0 913 953, the speed of a mobile device relative to the access point (Radio Base Station) of the cell to which the mobile device is associated is determined by measuring a Doppler effect in the signal received from the mobile device.

As described also in the 3rd Generation Partnership Project (3GPP) specification "UE Radio Transmission and Reception (FDD)", Technical Specification TS 25.01, speed measurement is through Doppler measurements.

The Doppler shift of a radio frequency (RF) signal is equal to the speed at which it is moving towards or from the measurement point, with increased or decreased frequency, respectively.

Assuming a substantially circular cell shape, the Doppler effect will only reveal the speed of a mobile device in a radial direction relative to the access point of the cell. When a mobile device is moving in another direction only the speed resolved in the radial direction is measured and hence a lower speed than the actual speed will be measured.

The HCS scheme may misinterpret (and underestimate) the speed of a mobile device and the time the mobile device may actually be within a cell for slow-moving users. Thus, for example, a prediction regarding hand-over of users to adjacent cells (or another HCS layer) may be inaccurate, which disadvantageously may affect the user-load within the HCS layers and cells.

In addition, this type of speed measurement by Doppler frequency relies on a very accurate knowledge of the centre frequency of both transmitter and receiver. An error of 200 Hz (at 2 GHz) introduces an error of 30 m/s=8.3 km/h. 3GPP TS 25.01 specifies ±0.1 ppm (parts per million) which corresponds to a Doppler shift of 200 Hz.

Alternatively, a method to estimate changes in user-load within the HCS cells is known that applies the counting of the number of hand-overs that each mobile device within the HCS network initiates per time instance. However, this method is very rough. On average, hand-overs only occur once every 10 seconds. When some events need to be filtered in order to get a reliable result, several minutes may pass, in which many events may happen, which reduces the interest of the information (e.g., change of speed, start/stop of a call, different coverage conditions, . . . ).

As a further alternative, a mobile device may be equipped with a Global Positioning System (GPS) to determine the speed of the mobile device. This method requires additional hardware at each mobile, which disadvantageously increases the cost of such a mobile device. Moreover, it requires the GPS system to be available within the (full) HCS network. For various reasons, this may not be the case.

SUMMARY OF THE PRESENT INVENTION

It is an object of the present invention to provide a speed indication device for determining the speed of a mobile device within a telecommunication network that is more accurate than speed indication devices from the prior art.

To obtain these and further objects, the present invention relates to a speed indication device as defined in the preamble of claim 1, characterised in that the speed indication device determines the speed indication signal from a sequence of transmit power control commands sent by the wireless mobile telecommunication device to an access point in a wireless telecommunication network for controlling, in use, a transmit power of a radio signal transmitted by the access point to the wireless mobile telecommunication device and in that the speed indication device comprises:
  a memory for storing the sequence of transmit power control commands:
  a logical filter circuit for determining a radio signal strength minimum in the radio signal at a location of the mobile telecommunication device by detecting if a predetermined number of consecutive transmit power control commands from the sequence of transmit power control commands each comprise either an 'up' or a 'down' transmit power control command.

The speed indication device according to the present invention thus determines the speed of a mobile device by comparing the tendency of a successive series of TPC data received from the mobile device. Advantageously, the information obtained from the TPC data can provide an estimation of the actual speed of the mobile device, which is more accurate than the estimate provided by speed indication devices from the prior art.

Moreover, the present invention relates to a telecommunication access point comprising a speed indication device as described above.

Furthermore, the present invention relates to a method for a speed indication device, as described above, characterised in that the method comprises determining the speed indication signal from a sequence of transmit power control commands sent by the wireless mobile telecommunication device to an access point in a wireless telecommunication network for controlling, in use, a transmit power of a radio signal transmitted by the access point to the wireless mobile telecommunication device, and determining a radio signal strength minimum in said radio signal at a location of said mobile telecommunication device (14) by detecting if a predetermined number of consecutive transmit power control commands from said sequence of transmit power control commands each comprise either an 'up' or a 'down' transmit Rower control command.

BRIEF DESCRIPTION OF THE DRAWINGS

Below, the invention will be explained with reference to some drawings, which are intended for illustration purposes only and not to limit the scope of protection as defined in the accompanying claims.

DESCRIPTION OF PREFERRED EMBODIMENTS

Figure 1:
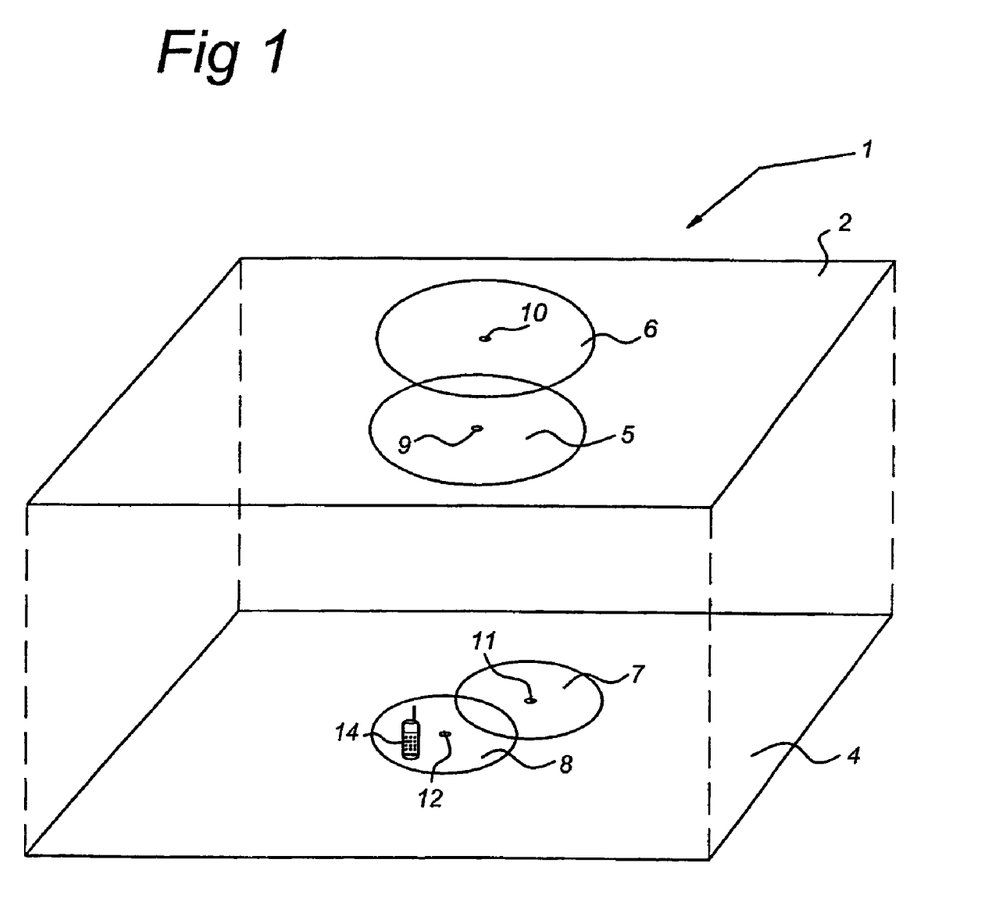
FIG. 1 shows schematically a wireless network in which a speed indication device according to the present invention is implemented.

FIG. 1 shows schematically a wireless telecommunication network in which the speed indication device according to the present invention is implemented.

The wireless telecommunication network 1 is configured according to the Hierarchical Cell Structure concept. The network 1 comprises a plurality of layers (i.e., at least two), each layer having one frequency and comprising a plurality of (circular) cells. For reasons of clarity, only a first and second layer 2, 4 are shown, with cells 5, 6 and cells 7, 8 associated with first layer 2 and second layer 4, respectively. Each of the cells 5, 6, 7, 8 is set-up by a respective access point (Radio Base System) 9, 10, 11, 12. Within each (frequency) layer 2, 4 the size of the cells is constant, e.g., in one layer the cell radius is 1 km, in the other layer the cell radius is 100 m. As an example, in the first layer 2 a first and second larger cell 5, 6 are defined in the HCS. In the second layer 4 a first and a second smaller cell 7, 8 are defined. Within the cells a plurality of mobile telecommunication devices, such as mobile telephones, are each associated with one of the cells 5, 6, 7, 8 in a way known to persons skilled in the art. The description will now further be given with reference to one such mobile telephone 14. However, it is to be understood that the invention is equally applicable for any other kind of mobile telecommunication device, as indicated earlier.

As described above, mobile telephone 14 may move around within the network 1 with varying speed. While maintaining a dedicated channel, the mobile telephone 14 may leave one cell and enter another. This process of hand-over involves the dissociation with the former cell and association with the latter (as known by persons skilled in the art). During hand-over the user-load on each cell and the occupancy of the bandwidth will change for both cells. This may affect the throughput within the network.

While the mobile telephone 14 is within one cell, it monitors the signal strength of signals received from the access point to which it is associated. By sending Transmit Power Control (TPC) commands to the access point 9, 10, 11, 12 of the respective cell 5, 6, 7, 8, the mobile telephone can request from the access point to adapt its transmit power in such a way that at any location within the cell 5, 6, 7, 8, the mobile telephone will receive the signals from the respective access point 9, 10, 11, 12 with a sufficient signal strength. Normally, the mobile telephone will sent TPC commands that request the access point to increase its transmit power by a certain amount (e.g. a '1' TPC command) or to decrease it (e.g. a '0' TPC command), in order to obtain a sufficient reception signal strength.

Figure 2:
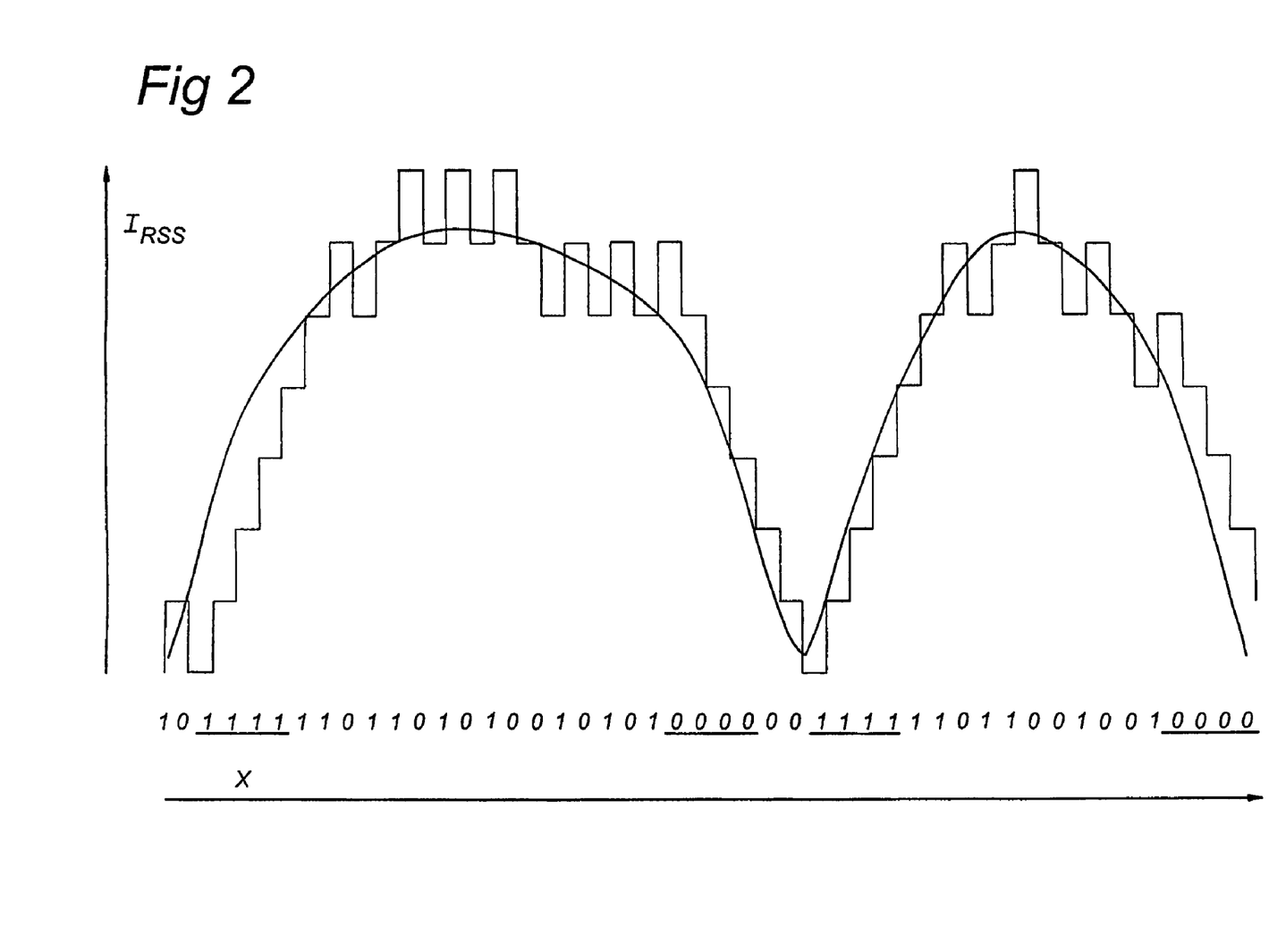
FIG. 2 shows schematically a relation between a strength of a radio signal in a radio environment and TPC data sent by a mobile device to an access point when traversing that radio environment having the signal strength as shown.

FIG. 2 shows schematically a relation between a strength of a radio signal in a radio environment and TPC data sent by a mobile telephone to an access point when traversing that radio environment having the signal strength as shown.

In the present invention the observation is followed that the distance between power minima in a fading radio environment has a fixed typical distance of $\lambda/2$, where $\lambda$ is the wavelength of the radio signal.

In FIG. 2, the radio signal strength $I_{RSS}$ is plotted vertically as a function of the distance X of the mobile telephone to a respective access point in a radio network (solid line). The location's co-ordinates are plotted schematically in the horizontal direction in FIG. 2.

The TPC data sent by a mobile device traversing the radio network following the given radio signal strength $I_{RSS}$ is shown by a sequence of bits (0 or 1), with '1' denoting an increase of the observed radio signal strength, and '0' denoting a decrease.

The transmission power of the mobile telephone 14 traversing the radio network following the given radio signal strength as controlled by the access point 12 is depicted by the dashed stepwise function.

When the fading of the radio signal is at a maximum, the required power to meet the wanted signal-to-interference-ratio (SIR) target is more or less constant, so at that instant the TPC data received by the access point 12 from the mobile telephone 14 will contain zeros and ones in a more or less alternating way.

However, when the mobile device is moving it may go from a minimum to a maximum in the radio signal strength and visa versa, and several successive equal TPC data will be sent by the mobile telephone 14 when the observed radio signal strength $I_{RSS}$ is changing. In the TPC data sent by the mobile device (a TPC data sequence), examples of equal successive TPC data are illustrated by underlining the respective TPC data in the sequence of bits.

Within a access point according to the present invention a speed indication device is present for analyzing the tendency of the TPC data sequence received from the mobile telephone 14. By observing the tendency of the TPC data sequence received from the mobile telephone 14 the speed indication device can determine information concerning the speed of the mobile device relative to the maximum and minimum reception signal strength in the radio environment. The speed indication device determines a speed indication signal from the sequence of TPC commands sent by the mobile telephone 14 to the access point 12 for controlling, in use, the transmit power of a radio signal transmitted by the access point 12 to the mobile telephone 14.

Figure 3:
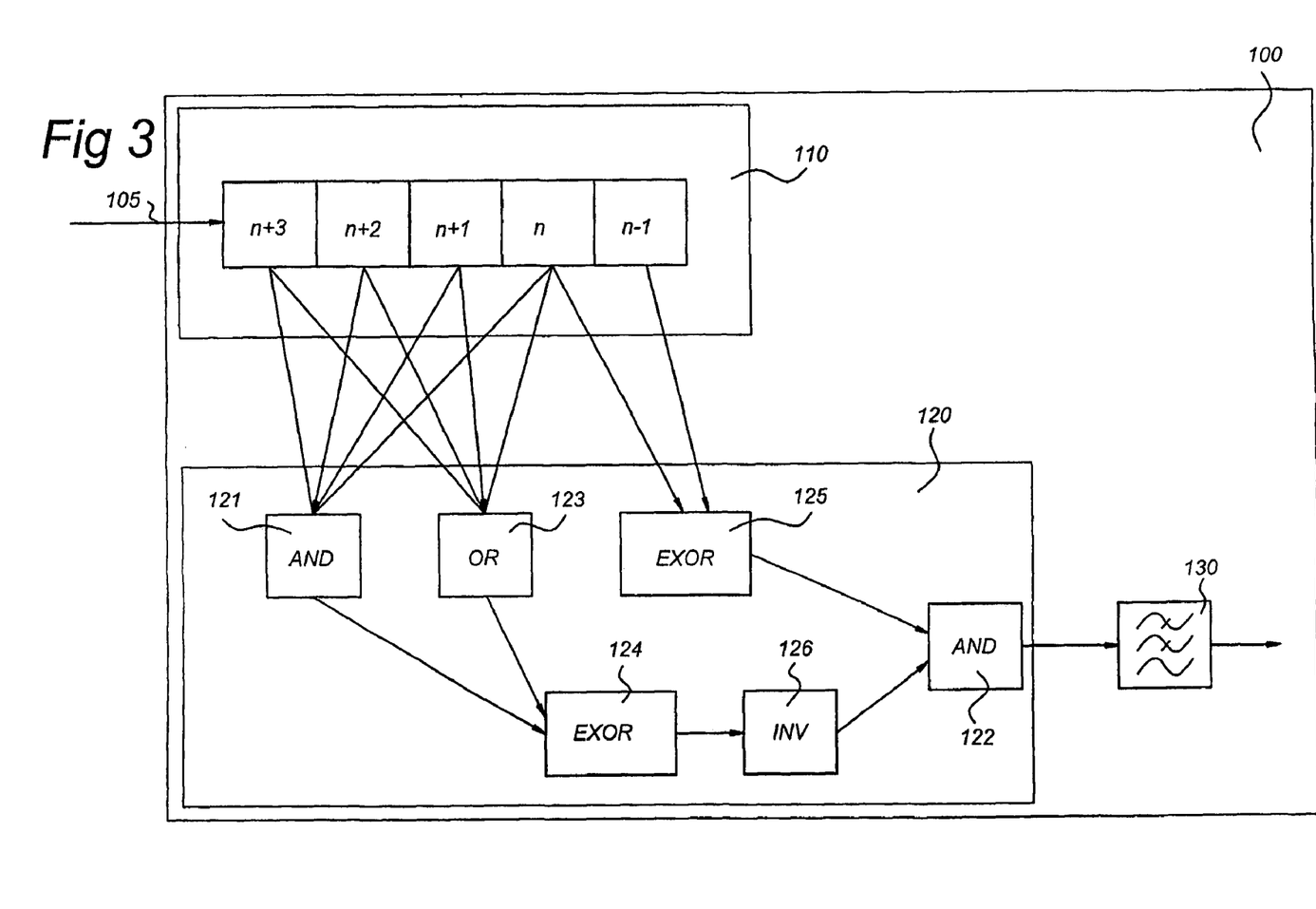
FIG. 3 shows schematically a speed indication device in accordance with the present invention.

FIG. 3 shows schematically a speed indication device 100 in accordance with the present invention.

The tendency of a TPC data sequence for traversing a minimum of radio signal strength while maintaining a dedicated channel is analyzed by a speed indication device 100 that compares if successive TPC data comprise equal values (i.e., '0' or '1'). In an embodiment, the speed indication device 100 of the present invention comprises a delay line memory 110, a logical filter circuit 120, and a signal filter device 130.

The delay line memory 110 comprises a plurality of memory cells of which in this example five consecutive cells n−1, n, n+1, n+2, n+3 are shown. The logical filter circuit 120 comprises basic logical devices: a first AND gate 121, a second AND gate 122, an OR gate 123, a first EXOR gate 124, a second EXOR gate 125, and an INV gate 126.

In the logical filter circuit 120 the output of first AND gate 121 is connected to a first input of first EXOR gate 124, the output of OR gate 123 is connected to a second input of first EXOR gate 124, the output of first EXOR gate 124 is further connected to the input of INV gate 126, the output of INV gate 126 is further connected to a first input of second AND gate 122, and the output of second EXOR gate 125 is connected to a second input of second AND gate 122. The output of second AND gate 122 is further connected to the input of signal filter device 130.

The delay line memory cells n−1, n, n+1, n+2, n+3 are connected to the logical circuit 120. Delay line memory cell n−1 is connected to a first input of second EXOR gate 125. Delay line memory cell n is connected to a second input of second EXOR gate 125, to a first input of OR gate 123, and to a first input of first AND gate 121. Delay line memory cell n+1 is connected to a second input of OR gate 123, and to a second input of first AND gate 121. Delay line memory cell n+2 is connected to a third input of OR gate 123, and to a third input of first AND gate 121. Delay line memory cell n+3 is connected to a fourth input of OR gate 123, and to a fourth input of first AND gate 121.

The delay line memory cells n−1, n, n+1, n+2, n+3 receive TPC data as input, in which successive data are entered into the respective successive delay line memory cells. Since the delay line memory 110 typically comprises a plurality of memory cells, the actual connection of delay line memory cells n−1, n, n+1, n+2, n+3, in the delay line memory 110 with the logical filter circuit 120 is made by e.g. an address decoder (not shown) or in any other way as known to persons skilled in the art. TPC commands received by the access point enter the speed indication device 100 at TPC command input 105.

The incoming TPC commands are compared with their predecessor(s). It is noted that various alternatives exist to do the comparison. FIG. 3 shows one exemplary approach of identifying bursts. A burst is a plurality of consecutive TPC commands. A burst indicating a minimum of the reception signal strength is defined here as at least four equal TPC commands (i.e., '1111'). It is noted that another number of equal TPC commands may also be used to identify a burst indicating a minimum of the reception signal strength.

When all values (n through n+3) are equal, the first 'AND' 121 and the 'OR' 123 function result in the same value. The first 'EXOR' function 124 provides a '0' when both values are equal, i.e., the burst contains all the same commands. This result is inverted by INV function 126, resulting in a '1' when all TPC commands are equal, and in '0' when at least one TPC command differs from the three other ones.

The second 'EXOR' function 125 is to check the start of a burst of TPC data that indicate a minimum of the reception signal strength. The start of the burst is when the TPC commands n and n−1 are not equal. Both results are combined through the second 'AND' function 122 and finally filtered in signal filter device 130.

Signal filter device 130 has the function for determining a running average of the burst rate (as it's output). This filter should typically have a time constant of one to a few seconds. (1 second=1500 samples). It is observed that bursts of equal TPC commands will occur more frequently at higher speed of the mobile telephone 14, since the reception signal strength will then vary more frequently while the mobile telephone 14 traverses a cell.

The resulting output of the signal filter device 130 will be called the TPC speed indication in the rest of the description.

Figure 4:
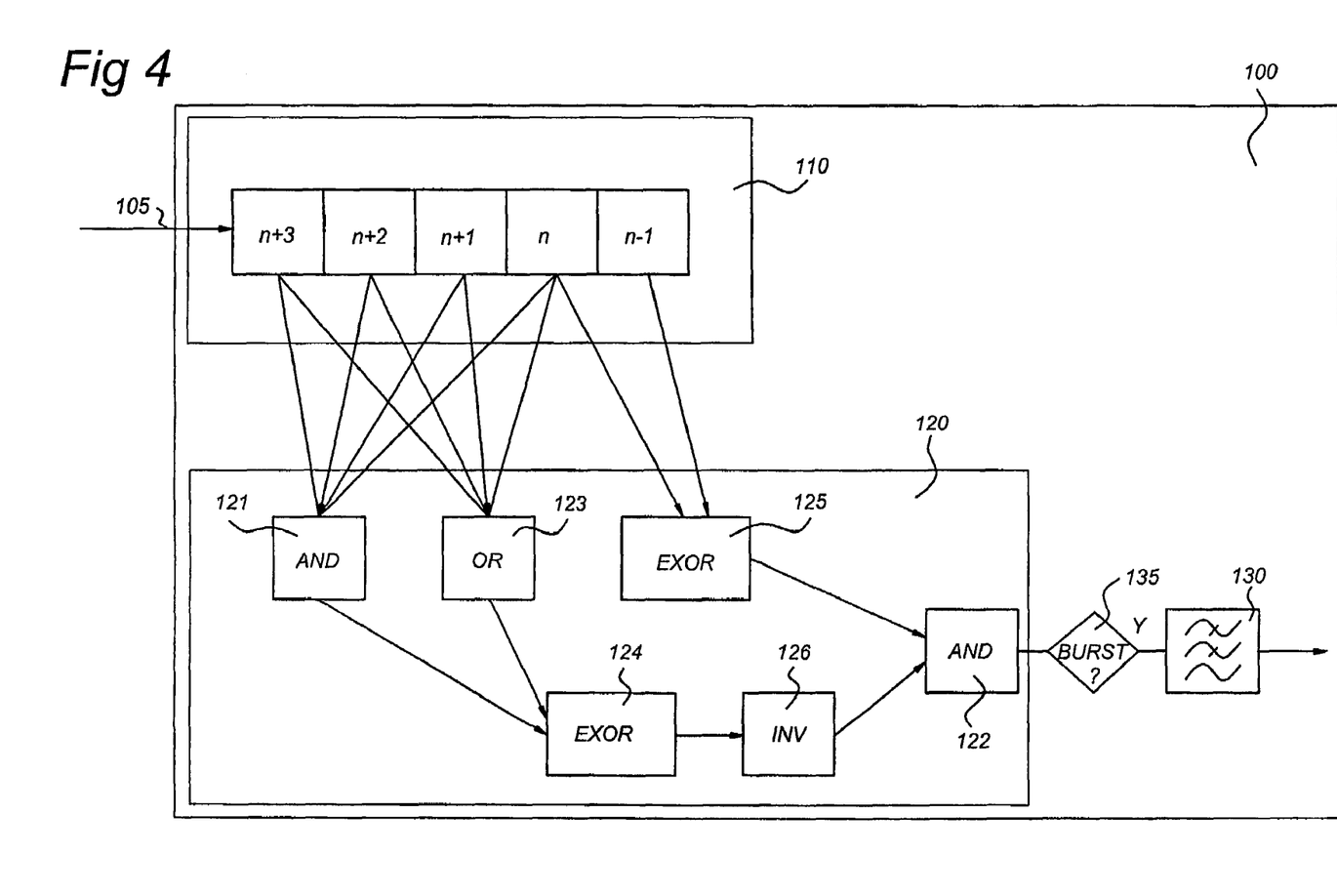
FIG. 4 shows schematically a further embodiment of the speed indication device in accordance with the present invention.

FIG. 4 shows schematically a further embodiment of the speed indication device in accordance with the present invention.

It is noted that in a further embodiment of the speed indication device 100, the speed indication device 100 is enhanced in the following way. In FIG. 4, entities with the same reference number as used in the preceding figures, refer to the same entities. In FIG. 4, between the second AND gate 122 and the signal filter device 130 a small burst checking device 135 is added that checks if the currently identified burst has the same signed TPC speed indication as in the previous burst, which obviously does not indicate the traversing of a cell as displayed by the relation between a strength of a radio signal in a radio environment and TPC data sent by a mobile telephone to an access point when traversing that radio environment as shown in FIG. 2. If successive bursts have the same signed TPC speed indication, the burst checking device 135 discards the last burst, else the burst is fed into the signal filter device 130. By this enhancement actual variation in signal strength of the transmitted signal (i.e., temporary dips and peaks) is observed by the speed indication device 100, instead of only observing flanks of the transmitted signal.

Figure 5:
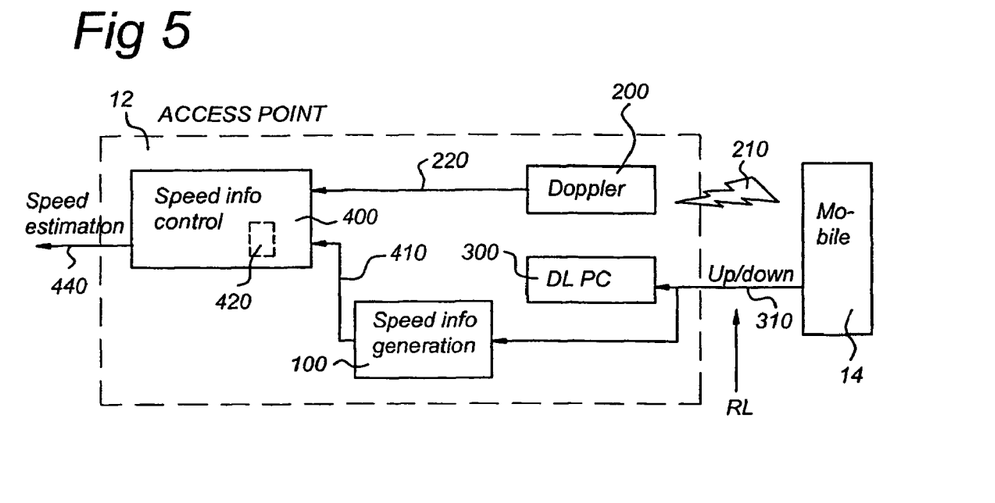
FIG. 5 shows schematically a speed information control loop function diagram for an access point in accordance with the present invention.

FIG. 5 shows schematically a speed information control loop function diagram for an access point in accordance with the present invention.

In the diagram a mobile phone 14 and an access point 12 are shown. The access point 12 comprise a Doppler frequency measurement device 200, a down link power control (DLPC) device 300, a speed indication device according to the present invention 100, and a speed information control device 400. The access point is shown to comprise the Doppler frequency measurement device 200, the DLPC device 300, the speed indication device 100, and the speed information control device 400 as separate devices. It is to be understood that such devices may also be implemented in one processor or in a plurality of processors.

In use, the mobile phone 14 is communicating to the access point by a radio link RL. The DLPC device 300 is receiving TPC data by TPC command link 310 from the mobile phone 14. TPC command link 310 is also connected to speed indication device 100 as TPC command input 105.

Speed indication device 100 is connected to speed information control device 400 by an output comprising a speed indication signal 410.

Doppler frequency measurement device 200 is receives a radio signal 210 from the mobile phone 14 via radio link RL.

Further, Doppler frequency measurement device 200 is connected to speed information control device 400 by an output comprising Doppler measurement signal 220.

The speed information control device 400 receives speed indication signal 410 and Doppler measurement signal 220 and has an output comprising a speed estimation signal 440, which can be used further by the access point.

As described above, within a cell of the telecommunication network, mobile phone 14 and the access point 12 maintain radio link RL during their association. While maintaining this radio link RL the mobile phone 14 controls the transmission power of the access point 12 through the down link power control (DLPC) device 300. The transmission power is controlled in such a way that the quality of the signal, received by the mobile phone 14, is just sufficient The DLPC device 300 performs this control by observing the quality of the reception, indicated by TPC command link 310 which provides an input sequence comprising 'up/down' signals. When the observed quality is over the required quality, a 'down' command is sent to the access point 12; when the observed quality is under the required quality an 'up' command is sent to the access point 12. ('Up' and 'Down' commands are denoted by a '1' and '0' TPC bit, respectively, as shown in FIG. 2).

Further, the Doppler frequency measurement device 200 determines the speed of the mobile phone 14 by comparison of a received carrier frequency with an expected value of the carrier frequency (at zero speed). The received carrier frequency is changed relative to the carrier frequency at zero speed due to the Doppler effect, which will be explained below in more detail.

In the present invention, the information on the speed of the mobile telephone 14 can be used in a few different ways.

In a first embodiment, the information on the speed of the mobile telephone 14 is determined by speed info control device 400 from only the TPC speed indication signal 410 generated by the speed indication device 100 according to the present invention.

The speed estimation signal 440 output by the speed info control device 400 is derived from the speed indication signal 410.

In a second embodiment, the information on the speed of the mobile telephone 14 is determined by combining Doppler speed measurement as done by Doppler frequency measurement device 200 and TPC speed indication signal 410 generated by the speed indication device 100.

In the Doppler speed measurement the Doppler frequency measurement device 200 compares the received carrier frequency of the received signal with an expected value (of the carrier frequency at zero speed). The difference in frequency is proportional to the speed of the mobile phone 14 to or from the access point 12. The observed speed is:

$$v = \frac{f_D}{f_c} \cdot c$$

where $f_D$ is the measured Doppler frequency, $f_c$ is the carrier frequency (e.g., 2 GHz) and c is the speed of light (3 $10^8$ m/s).

The observed frequency is on average 2/90 times the real speed due to the fact that any movement to or from the access point 12 is not observed.

Generally, the Doppler measurement signal 220 shows a more accurate speed value at high speeds, while the TPC speed indication signal 410 shows a more accurate speed value at low speeds. So, in this second embodiment, it is provided that when the Doppler measurement by Doppler measurement device 200 shows a speed less than a predefined threshold, the TPC speed indication signal 410 is used by speed indication control device 400, while at speeds above this predefined threshold the Doppler information signal 220 will be used.

In a third embodiment the information on the speed of the mobile telephone 14 is determined by using both Doppler speed measurement signal 220 and speed indication signal 410, in combination with a tuning step at low speed.

Figure 6:
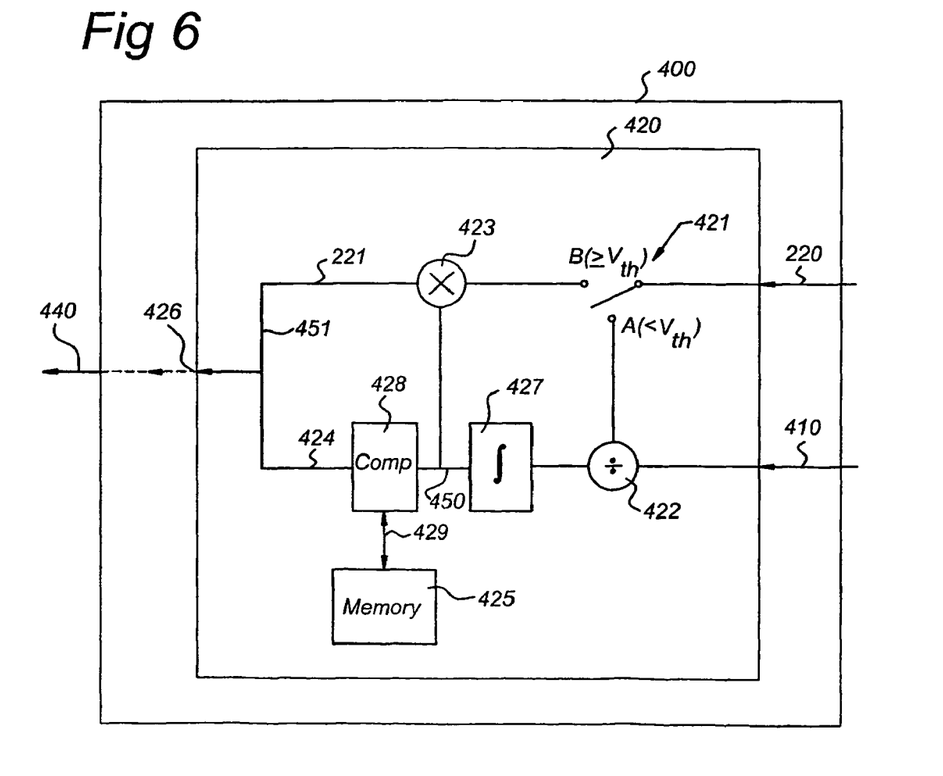
FIG. 6 shows schematically a further embodiment of a speed information control loop device for an access point in accordance with the present invention.

FIG. 6 shows schematically a third embodiment of a speed information control loop device 400 for an access point in accordance with the present invention. In FIG. 6, entities with the same reference number as used in the preceding figures, refer to the same entities. Speed information control device 400 comprises a speed tuning device 420. Speed tuning device 420 comprises an input for Doppler measurement signal 220, an input for TPC speed indication signal 410 and an output 426 for further determination of speed estimation signal 440 in speed information control device 400. Further, the speed tuning device 420 comprises memory 425 for storing speed-related information.

The speed tuning device 420 may be implemented as a processor, a logic control circuit or in software or in any other way known to those skilled in the art.

The basic strategy is similar to that of the second embodiment.

The memory 425 of speed tuning device comprises a lookup table which provides speed-related information in relation to the obtained tuning value 450. The speed tuning device 420 reads the value of the Doppler measurement signal 220 and compares this value with a predetermined threshold value Vth related to a switch 421.

If the Doppler measurement signal 220 shows a Doppler-related speed less than the predetermined threshold Vth, the speed estimation signal 440 determined by speed information control device 400 is based on the TPC speed indication signal 410 in the following way.

When the measured Doppler-related speed is low (less than the predetermined threshold Vth), the switch 421 is in position A (<Vth) and the speed tuning device 420 divides the value from the Doppler measurement signal 220 by the value from the TPC speed indication signal 410 in block 422. The result of the division is filtered in filter 427 with a long time constant in the speed tuning device 420 to provide a progressing time-averaged tuning value 450.

The memory 425 of speed tuning device comprises a lookup table which provides speed-related information 429 in relation to the obtained tuning value 450.

Typically, the tuning value 450 may be used by the speed tuning device 420 to retrieve in block 428 a speed-related information 424 relating to the obtained tuning value 450 from memory 425. The speed tuning device outputs this speed-related information 424 as output 426 for further determination of speed estimation signal 440 in speed information control device 400.

At a Doppler-related speed above the predefined threshold Vth, the Doppler measurement signal 220 is used as input for speed tuning device 420. Switch 421 is in position B ($\geq$Vth).

When the measured Doppler-related speed is high (above the predetermined threshold Vth, comparison made at switch 421) speed estimation signal 440 determined by speed information control device 400 is based on the TPC speed indication signal 410 in the following way.

The speed tuning device 420 divides the value from the Doppler measurement signal 220 by the value from the TPC speed indication signal 410 in block 422 to obtain the tuning value 450 which is then filtered in filter 427 by a long time constant to obtain a progressing time-averaged tuning value 450. The speed tuning device 420 then multiplies in block 423 the value from the TPC speed indication signal 410 with the progressing time-averaged tuning value 450 to obtain a tuned Doppler measurement signal 221. Next, the speed tuning device passes the tuned Doppler measurement signal 221 as output 426 to the speed information control device 400 for further processing to obtain a speed estimation signal 440.

Thus by determining an information on the speed of the mobile telephone 14 (i.e. speed-related information 424 or tuned Doppler measurement signal 221), the speed estimation value signal 440 is time-averaged and scaled relative to tuning value 450. Also, by applying the tuning value 450, which takes into account the relative accuracy of the Doppler measurement signal 220 and the TPC speed indication signal 410 in dependence of the speed of the mobile telephone 14, a more accurate estimation of the speed estimation signal 440 can be obtained.

It is noted that in speed tuning device 400 both the division and the multiplication operations may be done in hardware or in software.

The invention claimed is:

1. An apparatus for determining a speed indication signal indicating a speed of a wireless mobile telecommunication device relative to said apparatus, wherein said apparatus determines said speed indication signal from a sequence of transmit power control commands sent by said wireless mobile telecommunication device to an access point in a wireless telecommunication network for controlling, in use, a transmit power of a radio signal transmitted by said access point to said wireless mobile telecommunication device, wherein said apparatus comprises:
   a memory for storing said sequence of transmit power control commands;
   a logical filter circuit for determining a radio signal strength minimum in said radio signal at a location of said mobile telecommunication device by detecting if a predetermined number of consecutive transmit power control commands from said sequence of transmit power control commands each comprise either an 'up' or 'down' transmit power control command;
   a speed information control device for providing a speed estimation signal for said wireless mobile telecommunication device; and
   a Doppler frequency measurement device for determining a Doppler speed signal for said wireless mobile telecommunication device, said apparatus being adapted to provide said speed estimation signal in dependence on said speed indication signal for speeds of said wireless mobile telecommunication device below a predetermined threshold and on said Doppler speed signal for speeds above said predetermined threshhold;
   wherein said speed information control device comprises a speed tuning device, said speed tuning device operative to perform the steps of:
   determining a tuning value, said tuning value being a division of said Doppler speed signal over said speed-indication signal, said tuning value being filtered with a long-time constant; and
   providing, in dependence of a predetermined threshold ($V_{th}$), for determining of said speed estimation signal:
      speed-related information, in dependence of said tuning value, at speeds below said predetermined threshold ($V_{th}$); and
   a tuned Doppler measurement signal at speeds above said predetermined threshold ($V_{th}$), said tuned Doppler measurement signal being said Doppler measurement signal multiplied by said tuning value.

2. A method for determining a speed indication signal indicating a speed of a wireless mobile telecommunication device relative to a stationary wireless access point, said method comprising the steps of:
   determining said speed indication signal from a sequence of transmit power control commands sent by said wireless mobile telecommunication device to said access point for controlling, in use, a transmit power of a radio signal transmitted by said access point to said wireless mobile telecommunication device, wherein said step of determining said speed indication comprises the steps of:
      storing information related to at least a portion of said sequence of transmit power control commands; and,
      determining a radio signal strength minimum in said radio signal at a location of said mobile telecommunication device by detecting if a predetermined number of consecutive transmit power control commands from said sequence of transmit power control commands each comprise either an 'up' or 'down' transmit power control command;
   determining a Doppler speed signal for said wireless mobile telecommunication device;
   providing said speed estimation signal in dependence on said speed indication signal for speeds of said wireless mobile telecommunication device below a predetermined threshold and on said Doppler speed signal for speeds above said predetermined threshold;
   determining a tuning value for a speed information control device, said tuning value being a division of said Doppler speed signal over said speed-indication signal, said tuning value being filtered with a long-time constant; and,
   providing, in dependence of a predetermined threshold ($V_{th}$), for determining of said speed estimation signal:
      speed-related information, in dependence of said tuning value, at speeds below said predetermined threshold ($V_{th}$); and,
      a tuned Doppler measurement signal at speeds above said predetermined threshold ($V_{th}$), said tuned Doppler measurement signal being said Doppler measurement signal multiplied by said tuning value.

* * * * *

UNITED STATES PATENT AND TRADEMARK OFFICE
CERTIFICATE OF CORRECTION

| | |
|---|---|
| PATENT NO. | : 7,398,099 B2 |
| APPLICATION NO. | : 10/506389 |
| DATED | : July 8, 2008 |
| INVENTOR(S) | : Brouwer |

Page 1 of 1

It is certified that error appears in the above-identified patent and that said Letters Patent is hereby corrected as shown below:

In Column 8, Line 4, delete "2/90" and insert -- $2/\pi$ --, therefor.

Signed and Sealed this

Tenth Day of February, 2009

JOHN DOLL
*Acting Director of the United States Patent and Trademark Office*